United States Patent [19] [11] 3,934,040
Smerak et al. [45] Jan. 20, 1976

[54] BAKERY PRODUCT AND PROCESS

[75] Inventors: Louis J. Smerak, Wayne; Jason A. Miller, Dover, both of N.J.

[73] Assignee: Caravan Products Co., Inc., Totowa, N.J.

[22] Filed: Oct. 18, 1973

[21] Appl. No.: 407,453

[52] U.S. Cl. .................. 426/20; 426/23; 426/62; 426/63; 426/64
[51] Int. Cl.$^2$... A21D 8/04; A21D 2/22; A21D 2/24
[58] Field of Search ........... 426/20, 23, 62, 63, 212, 426/64

[56] References Cited
UNITED STATES PATENTS

| | | | |
|---|---|---|---|
| 3,053,666 | 9/1962 | Henika et al. | 426/23 |
| 3,578,462 | 5/1971 | Smerak et al. | 426/63 X |
| 3,595,671 | 7/1971 | Cooke et al. | 426/26 X |
| 3,617,305 | 11/1971 | Rolland et al. | 426/23 |
| 3,640,730 | 2/1972 | Rolland et al. | 426/62 |

Primary Examiner—James R. Hoffman
Attorney, Agent, or Firm—Kenyon & Kenyon Reilly Carr & Chapin

[57] ABSTRACT

An additive composition for a flour containing dough, the additive composition consisting essentially of the following ingredients: (a) L-cysteine; and (b) ascorbic acid wherein the proportions of said ingredients are based upon the weight of 100 pounds of the flour in the dough and are in the following amounts: (a) 0.001 to 0.012 pound; and (b) 0.0015 to 0.04 pound.

11 Claims, No Drawings

BAKERY PRODUCT AND PROCESS

DISCLOSURE OF THE INVENTION

This invention relates to extendable bakery products. More particularly, the invention relates to an additive composition for standard doughs in order to impart substantially permanent extensibility thereto.

In the bakery arts several classes of bakery products require that the dough used to prepare such products have a property defined herein as extensibility. These include, for example, doughs for French bread, pizza, elongated hard rolls, as well as standard white bread. The latter category includes standard hamburger rolls. The bakery products described are required to be stretched or extended during processing in order that the dough assume the desired physical shape and possess the desired characteristics in the final baked product. Elongation of the dough should be over a substantial length and of a permanent nature. The prior art has added L-cysteine in combination with oxidizing agents such as bromates or iodates to conventional doughs in order to impart the extensibility property to the dough. For example, see U.S. Pat. No. 3,053,666. Although providing a usable product, the prior art additive combination has been found to provide a product in which the overall extensibility is not as good as desired. It is believed that the interaction of the bromate oxidizing agent tends to firm the dough increasing its elasticity and tending to cause recovery or contraction of the dough after being stretched to shape. On the other hand, production of such bakery products using L-cysteine in the absence of bromate oxidizing agents tends to overcome the recovery problem. However, the quality of the bread suffers in its total bread score. For example, the loaf characteristics of grain, specific volume and center height are reduced.

We have now found that a particular combination of ingredients as hereinafter described when added to standard ingredients of a dough imparts to that dough, good extensibility properties and minimal recovery in combination with substantially improved bread scores.

Briefly, the present invention comprises an additive for a yeast raised bread product which provides a bread dough which is easily extendable to permanent elongation and upon being baked has good bread characteristics such as good grain structure and relatively high specific volume. The additive of this invention comprises a combination of L-cysteine and ascorbic acid in small quantities hereinafter described with standard dough ingredients. The bakery product results in a bread product having the improved qualities herein described. More particularly, our invention has application in the field of bakery products which include the so-called French bread type of breads; i.e., those products which have a generally overly elongated configuration including Italian bread and rolls (hard elongated rolls) and also what is conventionally referred to as pizza doughs. The invention is particularly useful in combination with cracker dough ingredients. It will be noted that in all of these instances the dough characteristics must be such that the dough, prior to being baked, has the characteristics of substantially permanent extensibility while holding its extended shape without further excessive relaxation of the dough.

The dough additive of this invention may be prepared in powder form or in tablet form. Essentially, the additive is prepared by admixing and blending carrier materials such as flour and/or starch together with the active materials of L-cysteine and ascorbic acid in their proper proportions. It has been found to be advantageous to add a fatty material such as conventional shortenings to the blended admixture in order to insure that there is a uniform admixture of the active materials in the composite formulation. In a preferred embodiment, the invention contemplates addition of small proportions of fungal enzymes, namely, fungal alpha amylase and fungal protease in order to assist in the relaxation of the proteins, and in order to convert the starches to sugars and also to assist in retarding the retrogradation of the starch thereby improving the shelf life of the product.

In another preferred embodiment, the additive combination of this invention has included therein the enzyme bromelain. It has been found that this particular proteolytic enzyme in combination with the principal active ingredients described above, namely L-cysteine and ascorbic acid substantially improves the extensibility property of the dough without materially affecting the desirable properties of the dough, namely, that it does not possess excessive relaxation properties. It has also been found that another proteolytic enzyme papain, is also useful for this purpose. However, in the event that the dough is permitted to be aged extensively, the papain enzyme tends to destroy the protein of the dough in its gluten form; the proteins are decomposed into the peptone and peptide decomposition products.

The proportions of the ingredients used in the additive composition of this invention are based upon the weight of flour used in the dough to which the additive is admixed. We have found that useful results are obtained with the proportions of L-cysteine for 100 parts by weight of flour in the dough are within the range of between about 0.001 pounds (10 ppm) of the flour up to about 0.012 pounds (120 ppm). Generally, below the minimum range mentioned, there will be no noticeable effect on the dough, whereas using proportions greater than about 120 ppm will impart to the dough extreme fluidity and materially reduce its ability to retain gas resulting in a baked product which would have extremely poor volume, large cell structure, thick cell walls. In the event that the additive is used with conventional white bread doughs, there will be side wall collapse, and in the event that the French bread is made from this dough, the dough mass will flow outward instead of rising normally while being baked. The preferred range is between about 20 ppm and 80 ppm, and the optimum range is about 25 – 50 ppm.

As to the ascorbic acid proportions, this ingredient is included in the dough formulation in proportion of between about 15 ppm and 400 ppm on the basis of the weight of flour in the dough. (0.0015 to 0.40 pounds per 100 pounds of flour). Below the 15 ppm range no appreciable affect is noted from the ascorbic acid ingredient. Proportions greater than 400 ppm will have a deleterious affect upon the dough by causing a reduction in the volume of the baked product, larger cell structure and thicker cell walls. The preferred range is between about 30 ppm to 200 ppm, and the optimum range is 40 ppm to 100 ppm.

The fungal enzymes, fungal alpha amylase and fungal protease, are used, preferably in combination, although less desirable, individually, in the range of about 6,000–150,000 Hemoglobin Units (HU) of the fungal protease enzyme and between about 6,000–500,000

SKB Units of the fungal alpha amylase enzyme for 100 pounds of flour. The preferred range is between about 8,000 to 75,000 HU and 10,000 to 50,000 SKB.

In use, the baker incorporates the additive composition directly into standard dough ingredients. In one example, the standard ingredients of a dough may comprise spring wheat flour, 100 pounds; sugar, 2 pounds; salt, 2 pounds; and shortening, 2 pounds. These typical ingredients are combined with the additive and 55 pounds of water and mixed and developed to proper dough development as is well known in the art. For convenience the additive composition may be prepared in such proportion of active ingredients that the baker may add a predetermined quantity of the additive composition to the dough ingredients which quantitiy will contain the proper proportion of the active ingredients. In a preferred embodiment of this invention the additive composition is prepared in powder form wherein the L-cysteine is present in proportion of 0.7% by weight of the additive; ascorbic acid 1.0%; fungal enzymes 0.2%*; shortening 4.0%; and the balance being carrier. These particular proportions of ingredients facilitate the baker's handling of the additive such that for every 100 pounds of flour in the dough, ½ pound of this specific additive composition is added to the dough ingredients.

*This proportion is determined to be sufficient to provide about 25,000 SKB Units of alpha amylase and 65,000 HU of fungal protease enzyme for 100 pounds of flour when the additive composition is added to the dough ingredients in the recommended quantities.

After dough development, the dough is relaxed for about 10 minutes; divided into proper weights; and, given an intermediate proof. Thereafter, the dough is are substantially improved when the additive composition of the present invention is used in combination with the dough ingredients to form doughs for bakery products which require good extensibility, namely, doughs useful for the French or Italian type of breads, pizza sheets and crackers. Several doughs were prepared and tested for permanent extensibility. Different additive compositions were included in the dough ingredients as well as a control example.

The following Table illustrates the benefits of the present invention by indicating the superior bread scores and specific volume values for white breads made in accordance with this invention. The Extensograph measurements record the length at which uniform pieces of dough (French bread dough and white bread dough) were streched to the breaking point subsequent to intermediate proof and molding. The extension at break is shown in millimeters. The resistance to extension is recorded in Brabender Units, indicating the resistance to extension of that same dough. The preferred doughs for this purpose have maximum extension and maximum resistance to extension. I.e., on a plot of resistance to extension versus extension at breaking point, the preferred dough for the purpose of this invention have maximum area under such a curve.

It will be noted that the control has a relatively low white bread score and specific volume. These figures increase reaching desirable values of 85 and 82 for bread score and 5.94 and 6.33 for specific volume as the additive compositions of the present invention are included in the standard dough ingredients. The Extensograph readings, similarly, describe the benefits of the present invention by indicating maximum extension for Example 3 in combination with a substantially high resistance to extension.

TABLE I

| Example | Ingredients | White Bread Score* / Specific Volume | Extensograph**(French Bread Dough) Extension At Break/Resistance | Extensograph (White Bread Dough) Extension At Break/Resistance) |
|---|---|---|---|---|
| 1 (Control) | Standard Dough | 70 / 5.22 | 228mm/580B.U. (only flour in dough) | 225mm/570B.U. |
| 2 | Standard Dough L-Cysteine | 75 / 5.23 | 253mm/370B.U. | 248mm/325B.U. |
| 3 | Standard Dough L-Cysteine Ascorbic Acid | 85 / 5.94 | 260mm/490B.U. | 252mm/490B.U. |
| 4 | Standard Dough L-Cysteine Ascorbic Acid Fungal Enzymes | 82 / 6.33 | — | — |

*The score is a qualitative test. A specific volume approaching 6.0 is good.
**See THE BAKERS DIGEST, Vol. 29, No. 2 pp. 27–30 (1955).

molded in the proper shape. For example, white breads are molded and panned prior to proofing and baking. The French or Italian types of breads are shaped into an elongated form either mechanically or by hand and then proofed prior to baking. Pizza doughs are molded typically by sheeting or pressing the dough either by hand or on machines for this purpose. The machines are known in the art which will provide a continuous length of sheeted dough. The pizza dough is baked immediately after sheeting with no intermediate proof, namely, it is baked in a so-called unleavened form. The general baking process described is well known in the art.

It has been found that the bread scores which measure the physical properties of the final bakery product It has also been found that the presence of bromolain enzyme and/or papain enzyme improves the quality of the final product.

It should be pointed out that the shortening content of the additive composition is added mainly for purposes of insuring uniform distribution of the active ingredients. Accordingly, the proportion of shortening can range from about 1–10% by weight of the additive composition. The preferred range is about 3–5%. The balance of the additive composition subsequent to inclusion of the active ingredients and other optional ingredients such as fungal enzymes, shortening, bromolain enzyme and papain enzyme is a conventional carrier such as flour and/or starch.

It will be understood that it is intended to cover all changes and modifications of the invention herein chosen for the purpose of illustration which do not constitute departures from the spirit and scope of the invention.

We claim:

1. An additive composition for a flour containing dough, said additive composition consisting essentially of the following ingredients:
   a. L-cysteine; and
   b. ascorbic acid,
wherein the proportions of said ingredients are based upon the weight of 100 pounds of said flour in said dough and are in the following amounts:
   a. 0.001 to .012 pound; and
   b. 0.0015 to .04 pound,
including in said composition enzymes selected from the group consisting of fungal alpha amylase enzyme; fungal protease enzyme; bromelain enzyme; and, papain enzyme.

2. The additive of claim 1 wherein the proportion of L-cysteine is between about 0.002 to 0.008 pound; the proportion of ascorbic acid is 0.003 to 0.02 pound; the proportion of fungal protease enzyme is in the range of about 6,000–150,000 Hemoglobin Units; and the proportion of fungal alpha amylase enzyme is between about 6,000–500,000 SKB Units.

3. The additive of claim 2 including shortening.

4. The process of making a yeast leavened bread dough product comprising the steps of:
   a. forming a dough by combining normal bread dough ingredients with L-cysteine in weight proportion of between about 0.001 to 0.012 pound for 100 pounds of flour in said dough and ascorbic acid in weight proportion of between about 0.0015 to 0.04 pound for 100 pounds of flour in said dough and including enzymes in said dough selected from the group consisting of fungal alpha amylase enzyme; fungal protease enzyme; bromelain enzyme; and, papain enzyme;
   b. extending said dough; and
   c. baking said extended dough.

5. The process of claim 4 wherein the proportion of L-cysteine is between about 0.002 to 0.008 pound; the proportion of ascorbic acid is 0.003 to 0.02 pound; the proportion of fungal protease enzyme is in the range of about 6,000–150,000 Hemoglobin Units; and the proportion of fungal alpha amylase enzyme is between about 6,000–500,000 SKB Units.

6. The process of claim 5 including shortening.

7. The process of making a yeast leavened bread dough product comprising the steps of:
   a. forming a dough by combining normal bread dough ingredients with L-cysteine in weight proportion of between about 0.001 to 0.012 pound for 100 pounds of flour in said dough and ascorbic acid in weight proportion of between about 0.0015 to 0.04 pound for 100 pounds of flour in said dough said flour being substantially free of any pretreatment with chlorine gas before said forming step,
   b. extending said dough; and
   c. baking said extended dough.

8. A yeast leavened bread dough containing an additive consisting essentially of:
   a. L-cysteine; and
   b. ascorbic acid
wherein the proportions of said ingredients are based upon the weight of 100 pounds of flour in said dough mixture and are in the following amounts:
   a. 0.001 to 0.012 pound; and
   b. 0.0015 to 0.04 pound,
including in said additive enzymes selected from the group consisting of fungal alpha amylase enzyme; fungal protease enzyme; bromelain enzyme; and, papain enzyme.

9. The dough of claim 8 wherein the proportion of L-cysteine is between about 0.002 to 0.008 pound; the proportion of ascorbic acid is 0.003 to 0.02 pound; the proportion of fungal protease enzyme is in the range of about 6,000–150,000 Hemoglobin Units; and the proportion of fungal alpha amylase enzyme is between about 6,000–500,000 SKB Units.

10. The dough of claim 9 including shortening.

11. A yeast leavened bread dough containing an additive consisting essentially of:
    a. L-cysteine; and
    b. ascorbic acid
wherein the proportions of said ingredients are based upon the weight of 100 pounds of flour in said dough mixture and are in the following amounts:
    a. 0.001 to 0.012 pound; and
    b. 0.0015 to 0.04 pound,
said flour being substantially free of any pre-treatment of chlorine gas before said additive addition.

* * * * *